United States Patent [19]

Pratt

[11] Patent Number: 4,752,169
[45] Date of Patent: Jun. 21, 1988

[54] FLUSH BREAK BLIND BOLT

[75] Inventor: John D. Pratt, Rancho Cucamonga, Calif.

[73] Assignee: Monogram Industries, Inc., Providence, R.I.

[21] Appl. No.: 724,111

[22] Filed: Apr. 12, 1985

[51] Int. Cl.$^4$ ............................................. F16B 13/04
[52] U.S. Cl. ........................................ 411/43; 411/54
[58] Field of Search ....................... 411/43, 54, 55, 39, 411/70, 38, 34, 44, 35, 36, 37

[56] References Cited

U.S. PATENT DOCUMENTS

| Re. 20,055 | 8/1936 | Huck | 411/43 X |
|---|---|---|---|
| 2,061,629 | 11/1936 | Huck . | |
| 3,222,977 | 12/1965 | Vaughn | 411/39 |
| 3,262,353 | 7/1966 | Waeltz | 411/39 |
| 3,348,444 | 10/1967 | Brignola . | |
| 3,657,955 | 4/1972 | McKay | 411/38 |
| 4,312,613 | 1/1982 | Binns | 411/34 |
| 4,376,604 | 3/1983 | Pratt | 411/34 |
| 4,579,491 | 4/1986 | Kull | 411/44 X |

FOREIGN PATENT DOCUMENTS

| 734147 | 12/1969 | Belgium . | |
|---|---|---|---|
| 510011 | 2/1955 | Canada | 411/34 |
| 7930213 | 7/1980 | France . | |
| 1036505 | 7/1966 | United Kingdom . | |

Primary Examiner—Gary L. Smith
Assistant Examiner—Adrian H. Whitcomb, Jr.
Attorney, Agent, or Firm—Pretty, Schroeder, Brueggemann & Clark

[57] ABSTRACT

A blind fastener comprising:

a nut with an axial bore therethrough, a bolt extending through the nut with a sleeve encircling the bolt between the head of the bolt and the nut body, and a stop ring provided on a screw threaded portion of the bolt, the bolt having a break groove therein, between the nut body and the bolt head. As the bolt is advanced upwardly during installation, the stop ring abuts the terminal end of the nut body. This sudden resistance to further travel causes the screw threaded portion to fracture at the break groove thus providing a clean break at the break groove substantially filling a cavity in the nut head thereby increasing the strength of the installed fastener and eliminating any need for shaving off the broken-off screw threaded portion.

14 Claims, 2 Drawing Sheets

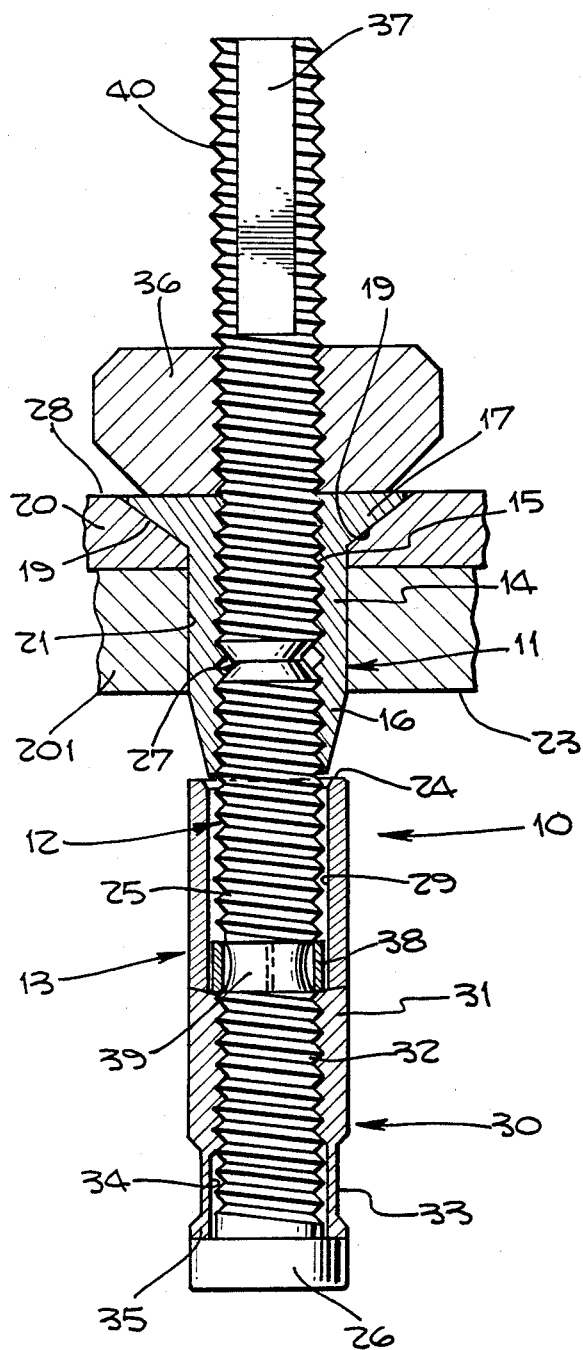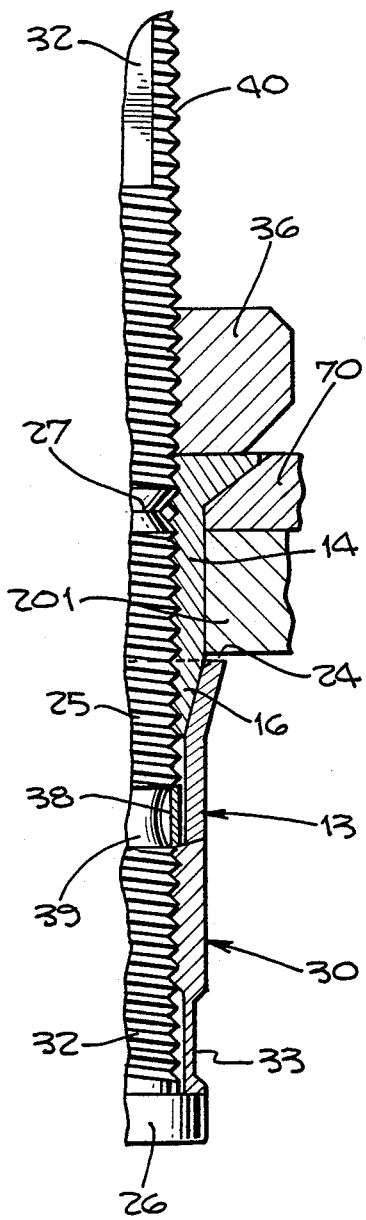

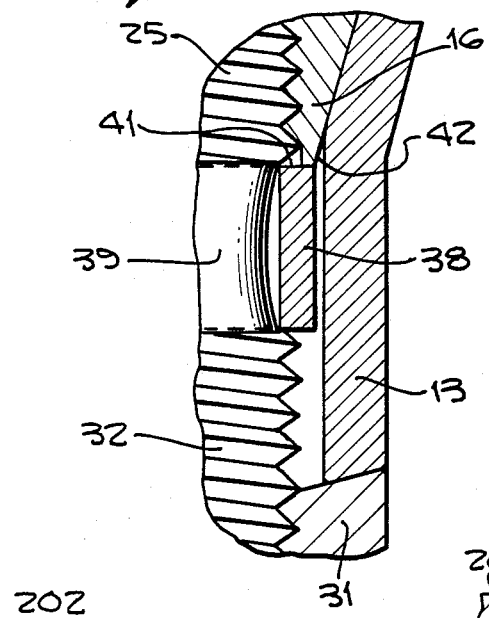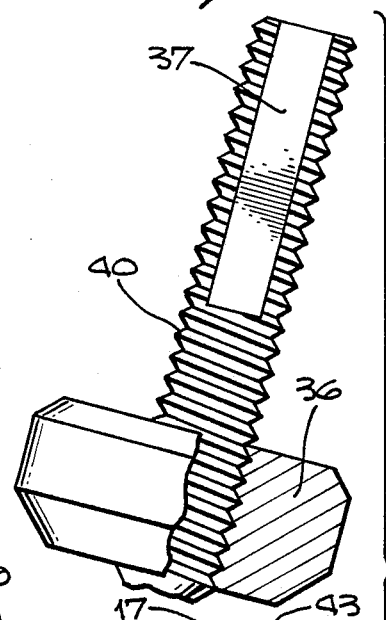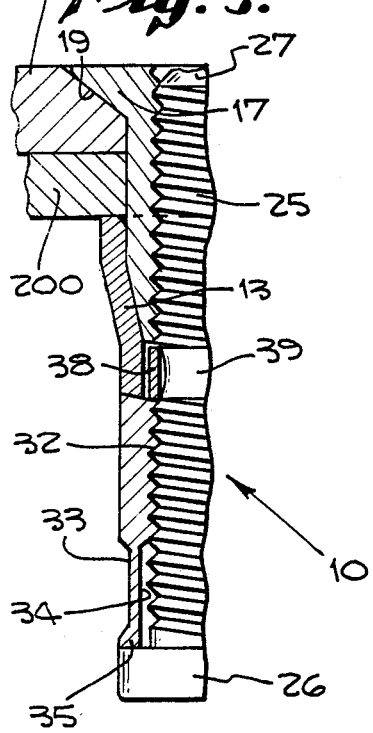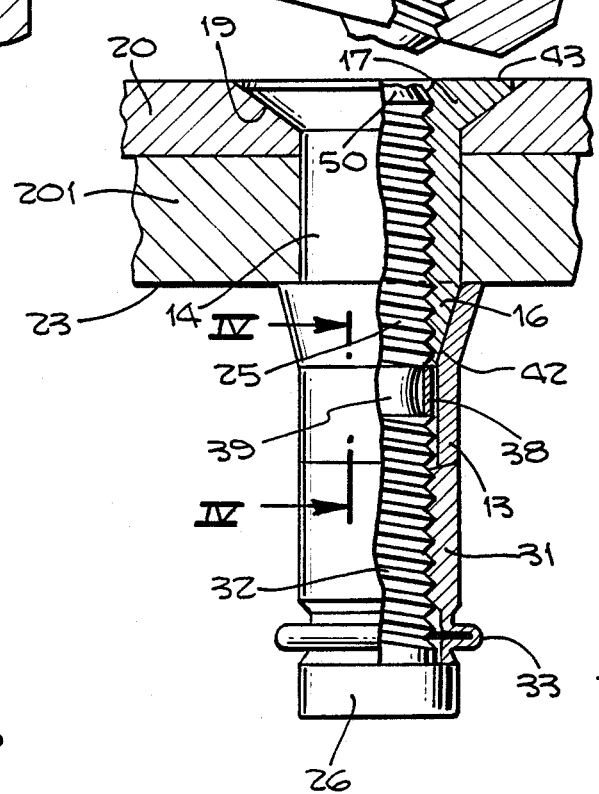

FLUSH BREAK BLIND BOLT

BACKGROUND OF THE INVENTION

1. Field of the Invention

This invention relates to blind fasteners; and, particularly to those used in the aircraft industry.

2. Description of the Prior Art

Blind fasteners used in securing sheets of abutting material are well known in the art, particularly in the aircraft industry. Such fasteners generally include a nut, a bolt and a sleeve. The nut has a body with a threaded axial bore therethrough, a chamfered nose at one end and a head at the other. A bolt is threaded in the nut body, the bolt having a head at one end. A hollow cylindrical sleeve surrounds the threaded bolt shaft between the chamfered nose of the nut and the bolt head. In installation, the abutting sheets are of varying thicknesses and the fasteners are mounted in aligned holes in the sheets. As the threaded shaft of the bolt is drawn through the nut body, the sleeve is pushed by the bolt head and rides up and over the chamfered end of the nut and abuts against the sheets thus locking the fastener in position.

Certain of these fasteners have a break groove at a predetermined location along the threaded shaft. The overall thickness of the sheets varies. Due to the preset location of the break groove, various degrees of installation conditions may result, varying from a minimum grip to a maximum grip. In either case, when the sleeve hits or abuts against the abutting sheet of the installation, break off of the stem or threaded shaft occurs at the break groove.

In a minimum grip situation, the break groove, at break off, is located higher along the stem or threaded shaft and closer to the surface of the head of the nut body. Generally speaking, one locates this break groove so that it breaks off about 0.000 to −0.098 inches with respect to the surface of the nut head. Thus, if the installed condition of the fastener is at the maximum grip condition, the shaft will break off below the surface of the nut head and thus the installation will not be as strong as in a minimum grip condition (where the shaft break off is substantially flush with the surface of the nut head). Accordingly, a weak installation occurs.

One solution to this situation is to relocate the break groove or move it up the shaft so that it breaks off either at or above the nut head surface, about 0.000 to +0.098. However, in such an arrangement, it may be necessary to shave off the protruding tip or pintail of the broken off shaft after installation which entails considerable man hours.

There is a need for a fastener which allows for flush break throughout the entire grip range eliminating the need for machining of pintails yet provides a grip of the installation materials in which the fastener is installed.

SUMMARY OF THE INVENTION

It is an object of this invention to provide an improved blind fastener which breaks flush with the access side of an installation eliminating the need for machining of pintails.

It is a further object of this invention to provide a blind fastener which stem thereof breaks flush and fills the nut head resulting in increased strength.

It is still another object of this invention to carry out the foregoing objects in a manner in which such fastener breaks flush yet maintains a firm grip on the installation materials.

These and other objects are preferably accomplished by providing a fastener having a nut with an axial bore therethrough and a bolt extending through the nut with a sleeve encircling the bolt between the head of the bolt and the nut body. Stopping means is provided on a screw threaded portion of the bolt between the nut body and the bolt head. As the bolt is advanced upwardly during installation, the stopping means abuts the terminal end of the nut body. This sudden resistance to further travel causes the screw threaded portion to fracture at the break groove thus providing a break at the break groove substantially filling a cavity in the nut head thereby increasing the strength of the installed fastener and eliminating any need for shaving off of the broken-off screw threaded portion.

BRIEF DESCRIPTION OF THE DRAWING

FIG. 1 is a vertical cross-sectional view of an assembled fastener in accordance with the teachings of the present invention prior to setting of the fastener;

FIG. 2 is a vertical cross-sectional view of a portion of the fastener of FIG. 1 showing the first step in the installation thereof;

FIG. 3 is a vertical cross-sectional view of the fastener of FIGS. 1 and 2 shown fully installed in maximum grip;

FIG. 4 is a detailed view of a step in the installation of the fastener of FIGS. 1 to 3; and FIG. 5 is a vertical cross-sectional view of a portion of a fully installed fastener in a panel structure whose total thickness is equal to the minimum grip of the fastener.

DESCRIPTION OF THE PREFERRED EMBODIMENT

Referring now to FIG. 1 of the drawing, a blind fastener 10 in accordance with the teachings of the invention is shown. Fastener 10 includes a nut 11, a bolt 12 and a sleeve 13. The nut 11 has a body 14 with a threaded axial bore 15 therethrough. A nose 16 is provided at one end of nut body 14 in the preferred form of a conically shaped chamfer having an angle of about 15° to 30° to the axis of nut 11.

An enlarged head 17 is provided at the other end of nut body 14. The head 17 is adapted to seat in a cavity 19 in the access side of a pair of structural panels 20,201 or the like being fastened. As seen in FIG. 1, panels 20,201 have aligned holes forming an opening 21 therethrough communicating with cavity 19. The length of nut 11 is adapted to extend the external surface of the nut body 14 beyond the blind side 23 of the parts being fastened even in the maximum grip situation by a distance sufficient to permit the thin wall of sleeve 13 to adapt to the external surface of nut body 14, as will be discussed.

The bolt 12 has a threaded stem 25 extending through nut 11 and an enlarged head 26 at one end thereof (on the blind side 23 in FIG. 1). The diameter of head 26 is generally related to the diameter of nut body 14. A breakneck 27 is provided in stem 25 adapted to fracture when a preselected stress is applied to the bolt stem 25 during installation of the blind fastener 10. Such fracture is designed to occur when the breakneck is located flush with or slightly below the surface 28 on the access side of the part 20 being fastened upon completion of the installation of blind fastener 10.

Sleeve 13 may be a thin wall generally cylindrical member having a smooth internal wall 29 with a chamfered end 24. Grip adjuster 30 includes a main generally cylindrical body portion 31 threaded at section 32 on the interior thereof to the threaded portion of bolt 12. The thickness of body portion 31 is greater than the thickness of the thin wall of sleeve 13. Sleeve 13 is generally equal to the diameter of nut body 14. Body portion 31 is preferably integrally connected to a thin walled portion 33 having a smooth interior wall 34 and an enlarged annular edge 35 abutting against head 26 as shown.

Optionally, a drive nut 36 may be threaded on the upper end of threaded shaft 25 having a lower wall diameter greater than the diameter of the threaded axial bore 15 in the nut body 14. Shaft 25 also includes one or more wrenching flats 37 thereon above nut 36 as well known in the blind fastener art.

As particularly contemplated in the present invention, a stop ring 38 is provided on threaded shaft 25 below breakneck 27 and above head 26 and in the area of shaft 25 surrounded by sleeve 13. Stop ring 38 may be a smooth or machined portion of shaft 25 but is preferably a split cylindrical ring which is inserted or expanded over the threaded end 40 of shaft 25, then snapped into a groove 39 in shaft 25. In assembly, grip adjuster 30 is first inserted onto shaft 25 up against head 26, then ring 38, and then sleeve 13 is installed.

The operation of fastener 10 during installation thereof is shown in FIGS. 2 and 3. It is to be understood that a suitable installing tool (not shown), as is well known in the blind fastener art, is used to hold nut 36 and engage the wrenching flats 37 of screw shaft 25.

As illustrated in FIG. 2, as bolt 12 is drawn into nut 11, the chamfered end 24 of the thin walled sleeve 13 contacts the chamfer of the nut nose 16 and is expanded outwardly thereby. The grip adjuster 30 is locked to the screw threads of shaft 25. Upon further drawing of bolt 12 into nut 11, the thin walled sleeve 13 progresses along the body 14 of nut 11 (FIG. 2), until the shoulder 41 (FIG. 4) of ring 38 abuts against the end 42 of nut body tapered portion or nut nose 16.

This sudden resistance to further travel causes the screw to fracture at the break groove 27 with the thin portion 33 deforming as shown in FIG. 3. The broken portion of screw 25 with flats 37 thereon, and drive nut 36 threaded thereto, falls off as seen in FIG. 3. The distance from the shoulder 41 of stop ring 38 to the center of the break groove 27 is chosen so that it is related to the overall length of nut 11 to provide proper breakoff. If the grip of the fastener on the applications 20,201 is low or at the minimum, a strong grip is still provided. If the grip of the fastener on the applications 20,201 is high or at its maximum, such strong grip is accomplished with flush break without need for cutting off of pintails.

The grip adjuster, 30, since it is threaded to shaft 25, acts as a screw head and, in effect, moves the sleeve 13 up over nose 16 much in the manner of a screw head. The grip adjuster 30 stops rotating with the screw 25 when sleeve 13 hits surface 23 and deforms at 33 (FIG. 3) until ring 38 hits end 42. FIG. 5 shows the final installation in a minimum grip situation. In this view, like numerals refer to like parts of FIGS. 1 to 4 and the fastener 10 is identical to that of FIGS. 1 to 4. However, in this view the panels 200,202 differ in that they are thinner and thus a minimum grip of the panels takes place. In both embodiments, the broken off stem 25 breaks off at break neck 27 such that the broken off portion 50 (FIG. 3) fills the nut head, i.e., it does not protrude above the upper surface 43 (FIG. 3) of head 17.

It can be seen that there is disclosed a blind bolt which provides for flush break in both maximum and minimum grip situations and eliminates the need for shaving of the broken off stem of the bolt to provide flushness.

I claim:

1. In a blind fastener having a nut with an axial threaded bore therethrough and with a tapered nose at one end and an enlarged head at the other end, a bolt having a threaded stem extending through said nut and threaded thereto having an enlarged head spaced from said nut nose, said threaded stem having a break groove therein between said bolt head and the terminal end of said bolt, a sleeve encircling said stem between said bolt head and said nut nose, the improvement which comprises:

grip adjustment means associated with said sleeve and keyed to said stem for movement therewith, said grip adjustment means including a grip adjuster encircling said stem between said sleeve and said bolt head and having a portion thereof in threaded engagement with said stem, and nut nose abutment means associated with said stem on said stem between said nut nose and said stem head adapted to abut against said nut nose when said stem is rotated and said sleeve advances up and over said nut nose thereby presenting resistance to further advance of said threaded stem through said threaded bore causing said threaded stem to fracture at said break groove.

2. In the fastener of claim 1 wherein said grip adjuster includes an end abutting against said bolt head that is enlarged and said portion in threaded engagement with said stem is of a wall thickness greater than the wall thickness of said grip adjuster between said grip adjuster end and said portion in threaded engagement with said stem, said last mentioned wall thickness being relatively thin walled and smooth on the interior wall thereof.

3. In the fastener of claim 2 wherien said sleeve includes a smooth interior walled sleeve portion encircling said stem and said nut nose abutment means thereof between said grip adjuster and said nut nose.

4. In the fastener of claim 1 wherein said nut nose abutment means includes a stop ring encircling said stem having a shoulder thereon extending toward said nut nose and adapted to abut against said nut nose.

5. In the fastener of claim 4 wherein said stop ring is a split ring snap fitting into a groove on said stem.

6. In the fastener of claim 1 wherein the distance between said nut nose abutment means and said break groove is substantially the same as the overall length of said nut.

7. A blind fastener comprising:
a nut having an axial threaded bore therethrough with a tapered nose at one end and an enlarged head at the other end;
a bolt having a threaded stem threaded in said nut bore having an enlarged head spaced from said nut, the stem thereof having a break groove between said bolt head and the head of said nut;
a thin walled sleeve member encircling said stem between said nut nose and said stem head, said sleeve member being smooth-walled on the interior thereof;

a grip adjuster having a first portion threadably engaging said stem between said sleeve member and said stem head and a second portion extending from said first portion to said stem head and abutting there against, said second portion being of a thinner wall than said first portion and smooth-walled on the interior thereof with an enlarged head thereon abutting against said stem head; and a stop ring having a shoulder thereon extending toward said nut nose encircling said stem between said first portion and said nut nose and spaced from said break groove a distance substantially the same as the length of said threaded bore of said nut, the outer diameter of said stop ring being greater than the inner diameter of said nut bore.

8. In an aircraft installation including a pair of juxtaposed panel members having aligned apertures therein providing a hole through said members, said members having an access side and a blind side, a nut having an axial threaded bore inserted in said hole having an enlarged head on the access side, said head being tapered and conforming to a tapered cavity surrounding said hole on said access side, said nut having a tapered nut nose on said blind side, a bolt having a threaded stem threaded in said nut bore having a threaded end with flats thereon extending out of said nut on the access side, said stem having an enlarged stem head on the blind side, a sleeve encircling said stem between said nut nose and said stem head on the blind side, and a break groove in said stem between said nut head and said nut hose, the improvement which comprises:

said sleeve having a first thin walled portion encircling said stem between said nut nose and said stem head, said first portion being smooth walled on the interior thereof, and a second portion in threaded engagement with said stem between said first portion and said stem head, said second portion having an enlarged head abutting against said stem head and having a thin walled portion between said enlarged head and the portion threaded to said stem, and an abutment member on said stem between said second portion and said nut nose encircled by said first portion having a shoulder thereon adapted to abut against said nut nose when said stem is rotated so that the first portion of said sleeve advances up and over said nut nose until said abutment member engages and abuts against said nut nose.

9. A blind fastener for insertion through aligned openings in two panels to connect them together in overlapping outer and inner relation and adapted to be set by wrench means, said fastener comprising:

a generally tubular nut with an axial bore therethrough, said nut having an enlarged head at one end for engaging the outer panel and a tapered nose at the other end;

an externally threaded cylindrical stem passing through said bore in said nut, said stem having a wrench engaging region spaced outwardly from said enlarged nut head, an enlarged stem head spaced inwardly from said nut nose, and a break groove positioned between said stem head and the terminal end of said stem;

a deformable steeve encircling said stem between said nut nose and said stem head, outward movement of said stem through said nut causing said sleeve to deform over said nut nose and move into abutting engagement with the inner panel;

means for substantially preventing movement of said stem with respect to said nut after said fastener has been fully set and said stem has severed at said break groove;

deformable grip adjustment means on said stem between said sleeve and said stem head, outward movement of said stem causing said grip adjustment means to move said sleeve into abutting engagement with the inner panel; and nut nose abutment means on said stem, said abutment means adapted to abut against said nut nose when said break groove is in substantially flush relation to the outer surface of said nut head, said abutment means preventing further outward movement of said stem through said nut so that said stem severs at said break groove.

10. The fastener of claim 9, wherein said grip adjustment means comprises a deformable grip adjuster encircling said sleeve, said grip adjuster having a thick wall portion in threaded engagement with said stem and in abutment with said deformable sleeve;

an end portion in abutment with said stem head, and a deformable thin wall portion between said thick wall portion and said end wall portion, said thin wall portion being adapted to deform after said sleeve has moved into abutting engagement with the inner panel until said nut nose abutment means has moved into abutting engagement with said nut nose.

11. The fastener of claim 10, wherein said nut nose abutment means comprises a stop ring keyed to said stem for movement therewith, said stop ring having an outer end adapted to abut against said nut nose when said break groove is in substantially flush relation to the outer surface of said nut head.

12. The fastener of claim 11, wherein said stop ring is a split ring snap fit into a groove on said stem.

13. The fastener of claim 9, wherein said fastener further comprises an internally threaded drive nut in threaded engagement with said stem and in abutment with said nut head.

14. The fastener of claim 9, wherein said means for substantially preventing movement of said stem with respect to said nut after said fastener has been fully set comprises internal threads in said bore of said nut adapted to threadably engage the external threads on said stem.

* * * * *